United States Patent [19]
Brandt et al.

[11] Patent Number: 6,006,781
[45] Date of Patent: Dec. 28, 1999

[54] FUEL PRESSURE REGULATOR

[75] Inventors: Timothy B. Brandt; Allen L. Hudson, both of West Des Moines, Iowa

[73] Assignee: Parr Manufacturing, Inc., Des Moines, Iowa

[21] Appl. No.: 09/107,255

[22] Filed: Jul. 1, 1998

[51] Int. Cl.$^6$ .............................. F16K 17/26; F16K 31/12
[52] U.S. Cl. ........................................ 137/493.6; 137/508
[58] Field of Search ................................ 137/508, 593.6, 137/494

[56] References Cited

U.S. PATENT DOCUMENTS

| | | | |
|---|---|---|---|
| 3,216,608 | 11/1965 | McCormick | 220/44 |
| 3,439,873 | 4/1969 | Relf | 137/508 X |
| 3,441,050 | 4/1969 | Sanchez | 137/493.6 |
| 3,612,618 | 10/1971 | Swanson | 137/505.42 |
| 5,012,784 | 5/1991 | Fehrenbach . | |
| 5,078,167 | 1/1992 | Brandt et al. . | |
| 5,396,918 | 3/1995 | Parker | 137/508 X |
| 5,402,817 | 4/1995 | Bueser . | |
| 5,584,318 | 12/1996 | Brandt . | |
| 5,649,561 | 7/1997 | Brandt . | |

*Primary Examiner*—Denise L. Ferensic
*Assistant Examiner*—Joanne Y. Kim
*Attorney, Agent, or Firm*—Henderson & Sturm

[57] ABSTRACT

A fuel pressure regulator wherein the diaphragm is eliminated from the crimp securing the first and second portions of the regulator housing together, thus minimizing the strain on the diaphragm thereby extending the life of the diaphragm and the pressure regulator. The diaphragm has an annular flange that is disposed within an annular area defined by an annular interior periphery of the second housing portion and an annular exterior periphery of an end plate retained between first and second housing portions of the regulator. The diaphragm is thereby axially and radially restrained between the first and second housing portions without being clamped between the first and second housing portions thereby increasing the life expectancy of the diaphragm. The fuel pressure regulator further utilizes a valve member having an annular sealing surface. This annular sealing surface is spring biased against the diaphragm and enables a higher unit pressure at the seat thereby improving the sealing characteristics between the upstream portion of the regulator and the downstream portion of the regulator. The fuel flow through the regulator is controlled by a control spring opposingly biasing the diaphragm against the sealing surface of the valve member.

5 Claims, 4 Drawing Sheets

FUEL PRESSURE REGULATOR

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

This invention relates to fuel pressure regulators for use in fuel delivery systems of vehicles, and more particularly to diaphragmed fuel pressure regulators.

2. Description of the Related Art

Fuel pressure regulators for use in fuel delivery systems of vehicles are well known in the art. In a typical fuel delivery system for a vehicle, the fuel delivery system includes a fuel tank, a fuel pump, a fuel filter, a fuel pressure regulator, a fuel return line, and a fuel metering device for supplying the appropriate amount of fuel to the vehicle engine.

The fuel pump, typically electrically operated, constantly draws fuel through an inlet disposed within the fuel tank. The fuel is forced through the pump outlet where it enters a fuel filter/regulator assembly through a fuel supply port. Most of the fuel passes through the fuel filter and out through an outlet port that is connected to a fuel line that leads to a fuel metering device, such as a carburetor or fuel injectors, for supplying fuel to the vehicle engine. Due to the fuel pump constantly pumping fuel into the fuel line at flow rates usually higher than what is required by the engine, a device is required to return excess flow back to the tank to avoid excess pressure buildup. Most modern fuel delivery systems require that the pressure in the fuel metering device remain relatively constant, within certain tolerances. As such, a fuel pressure regulator is required to regulate the pressure in the fuel line. The fuel pressure regulator acts as a pressure release valve by enabling the excess fuel to be returned to the fuel tank, thus relieving the excess pressure in the fuel line. The fuel pressure regulator acts by opening a valve member when the pressure on the upstream side of the regulator exceeds a predetermined pressure level. When the pressure on the upstream side of the regulator returns to the predetermined pressure level, the valve member closes. Thus the fuel pressure regulator acts to keep the pressure in the fuel line relatively constant within certain prescribed tolerances.

Most fuel pressure regulators utilize a diaphragm and valve assembly which act to seal the upstream side of the regulator from the downstream side of the regulator. When the pressure on the upstream side of the diaphragm exceeds a predetermined pressure differential, the diaphragm is caused to deflect thus causing a valve member to open to release fuel through the regulator and out through the return line where it is returned to the fuel tank. Thus, it should be appreciated that if the diaphragm does not properly seal the upstream side of the diaphragm from the downstream side of the diaphragm, it would be impossible to regulate the fuel line pressure because a proper pressure differential could not be maintained. It should be readily apparent, then, that the life of the fuel pressure regulator is dependent on the life of the diaphragm. If the diaphragm fails to properly seal or becomes worn, the performance of the pressure regulator will suffer or fail.

In most conventional pressure regulators the diaphragm is typically fabricated from synthetic rubber and is usually restrained within the housing by crimping or clamping it between the upper housing portions and lower housing portions of the regulator. The clamping pressure is critical. Too little pressure on the edges of the diaphragm and the diaphragm will not be adequately sealed or held in place. Too much clamping pressure causes premature failure of the diaphragm where it is clamped. Since there is such a narrow tolerance for the clamping pressure, this increases the costs of manufacture and the likelihood of failure if tolerances are not met Consequently, there is a need for a solution to this problem.

Thus, there is a need in the industry for an extended life pressure regulator which secures the diaphragm in the device without direct clamping forces yet maintains an adequate seal between the upstream and downstream sides of the diaphragm.

Additionally, there is a need in the industry for improving the seating characteristics of the valve member for creating a tighter seal between the upstream side of the diaphragm and downstream side of the diaphragm. By improving the seating of the valve member, stricter tolerances can be achieved and thus the efficiency of the fuel delivery system can be improved.

Furthermore there is a need in the industry for miniaturizing fuel pressure regulators and for reducing the costs of manufacturing fuel pressure regulators.

BRIEF SUMMARY OF THE INVENTION

The fuel pressure regulator of the present invention is an improvement over conventional diaphragmed pressure regulators in that the diaphragm is eliminated from the crimp securing the first and second cover portions of the regulator housing together, thus minimizing the strain on the diaphragm and thereby extending the life of the diaphragm and the pressure regulator. In the present invention, the diaphragm has an annular flange that is disposed within an annular area defined by an annular interior periphery of the second housing portion and an annular exterior periphery of an end plate retained between the first and second housing portions of the regulator. The diaphragm is thereby axially and radially restrained between the first and second housing portions without being crimped. The fuel pressure regulator of the present invention further includes an improved valve member and seating arrangement for the valve member for improving the seal between the sealing surface of the valve member and the diaphragm, thus improving the seal between the upstream and downstream portions of the fuel pressure regulator. The valve member is cup shaped and includes an annular sealing surface. This annular sealing surface is spring biased against the diaphragm and enables a higher unit pressure on the seat thereby improving the sealing characteristics between the upstream portion of the regulator and the downstream portion of the regulator. The fuel flow through the regulator is controlled by a control spring opposingly biasing the diaphragm against the sealing surface of the valve member.

Therefore, an object of the present invention is the provision of an improved fuel pressure regulator.

Another object of the present invention is the provision of fuel pressure regulator that costs less to manufacture.

Another object of the present invention is the provision of fuel pressure regulator with an improved life expectancy.

Another object of the present invention is the provision of fuel pressure regulator with an extended life expectancy of the diaphragm.

Another object of the present invention is the provision of a fuel pressure regulator wherein the diaphragm is not crimped between the first and second housing covers.

Yet another object of the present invention is the provision of a fuel pressure regulator with an improved seating arrangement for the valve member thereby improving the seal between the upstream and downstream portions of the diaphragm.

A still further object of the present invention is the miniaturization of fuel pressure regulators.

Other objects, advantages, and novel features of the present invention will become apparent from the following detailed description of the invention when considered in conjunction with the accompanying drawings.

DETAILED DESCRIPTION OF THE INVENTION

Figure 1:
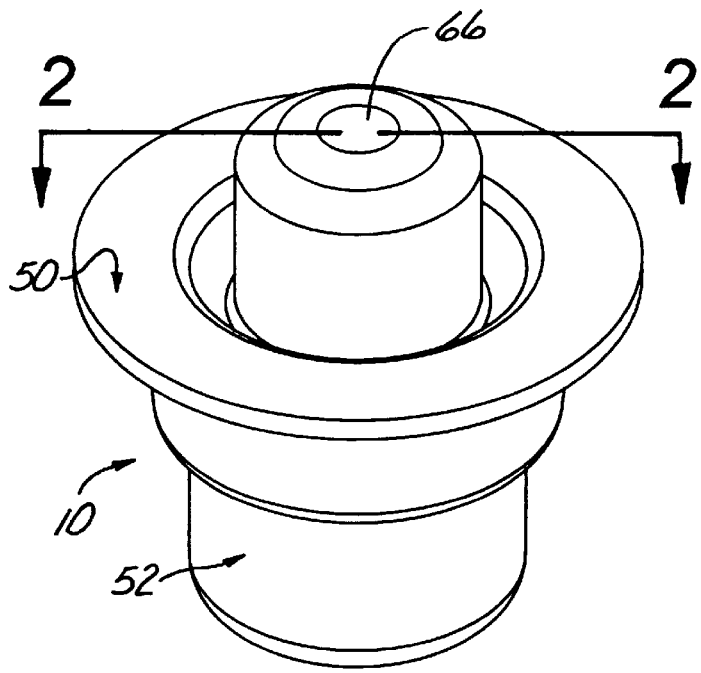
FIG. 1 is a perspective view of the fuel pressure regulator of the present invention.

Referring now to the drawings, wherein like reference numerals designate identical or corresponding parts throughout the several views, FIG. 1 shows a perspective view of the fuel pressure regulator (10) of the present invention.

Figure 4:
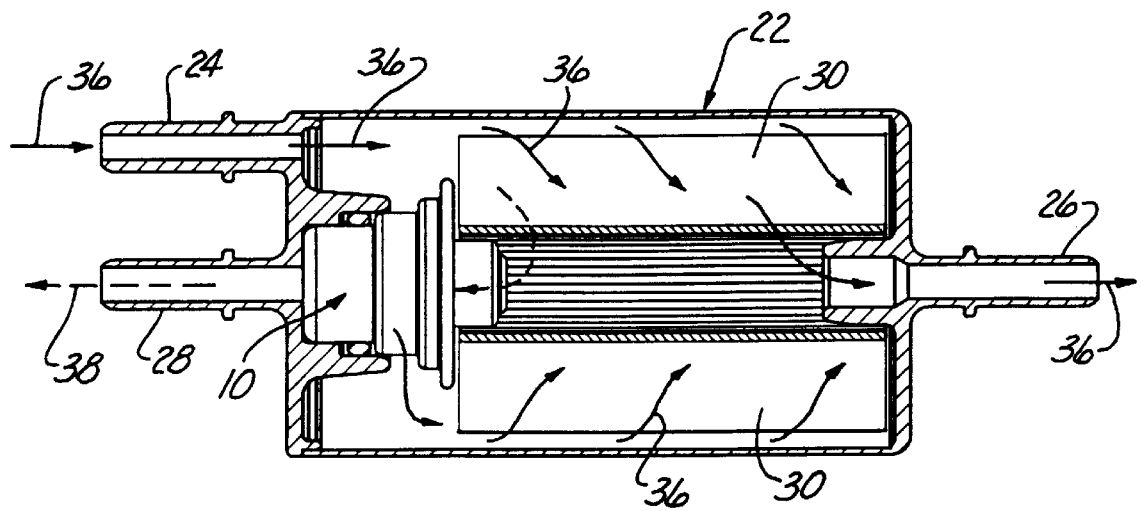
FIG. 4 is a cross-sectional view of the fuel pressure regulator of the present invention shown disposed in a fuel filter/regulator housing.
Figure 5:
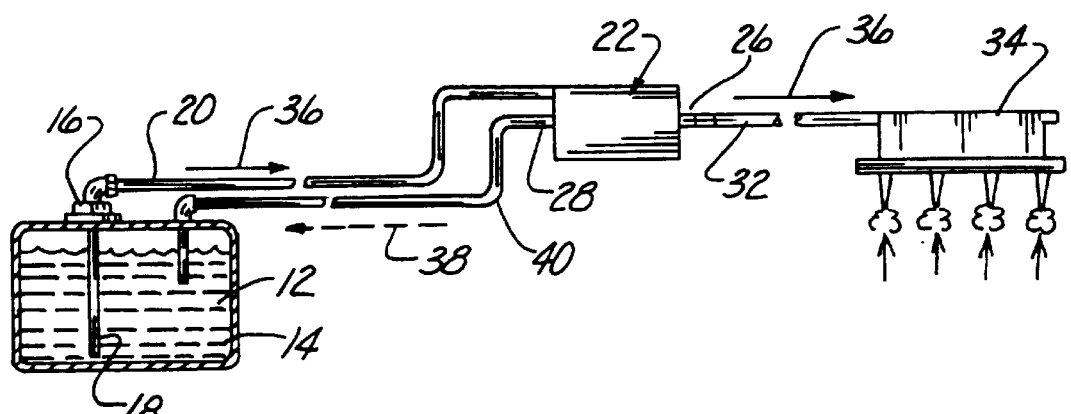
FIG. 5 is a schematic illustration of a typical fuel supply system for a vehicle.

In a typical fuel delivery system of a vehicle, as illustrated in FIG. 5, the fuel delivery system includes a fuel tank (12) with liquid fuel (14) therein. A fuel pump (16), typically electrically operated, constantly draws fuel (14) through the pump inlet (18) disposed within the tank (12). The fuel (14) is forced under pressure through the pump outlet (20) where it enters the fuel filter/regulator housing (22). Referring now to FIG. 4, the fuel pressure regulator (10) is shown disposed within the fuel filter/regulator housing (22) which includes a fuel supply port (24), a fuel outlet port (26) and a fuel return port (28). A fuel filter (30) is retained withing the fuel filter/regulator housing (22) for filtering particle contaminates from the fuel (14). When the fuel (14) enters the fuel filter/regulator housing (22) through the supply port (24), the fuel is forced through the fuel filter (30) and out through the outlet port (26) that is connected to a fuel line (32) (FIG. 5) leading to a fuel metering device (34) such as a carburetor or fuel injectors for supplying fuel to the vehicle engine (not shown). Due to the fuel pump (16) constantly pumping fuel into the system at flow rates usually higher than what is required by the engine, the fuel pressure regulator (10) acts as to regulate the pressure in the fuel line (32) by opening and closing at predetermined pressure levels to keep the pressure in the fuel line (32) relatively constant within certain tolerances. The fuel flow through the fuel delivery system is shown in FIGS. 4 and 5 with the solid arrow lines (36) indicating the fuel flow when the pressure regulator (10) is in a closed position and the dashed arrow lines (38) indicating the fuel flow when the pressure regulator (10) is in an open position. In FIG. 5, it can be seen that when the pressure regulator (10) is in the open position, the fuel (14) passes through the pressure regulator (10) out through the return port (28) where it is returned to the fuel tank (12) by the return line (40).

Figure 3:
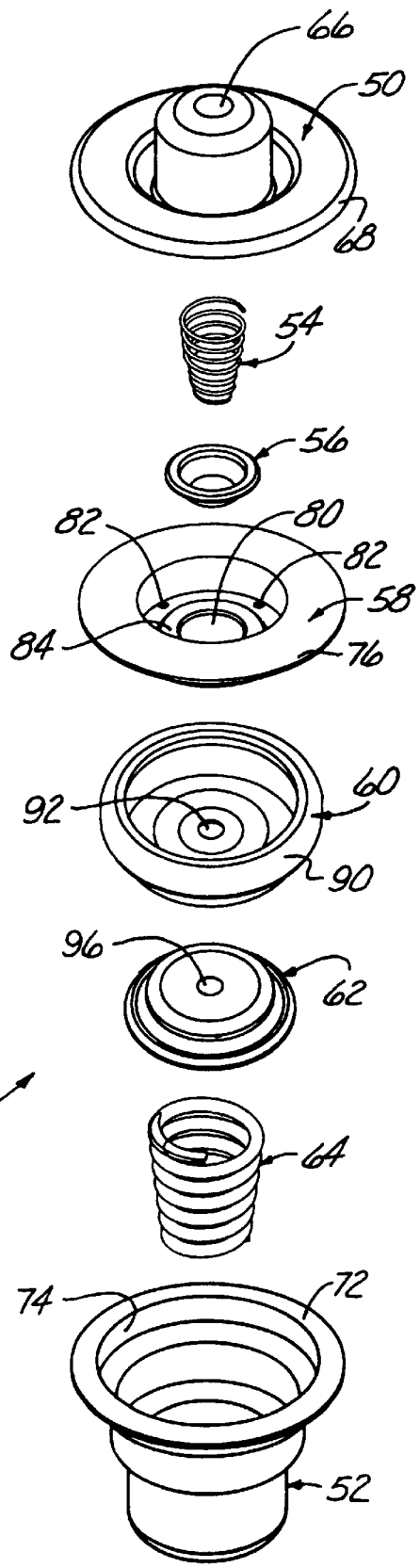
FIG. 3 is an exploded perspective view of the fuel pressure regulator of the present invention.
Figure 2:
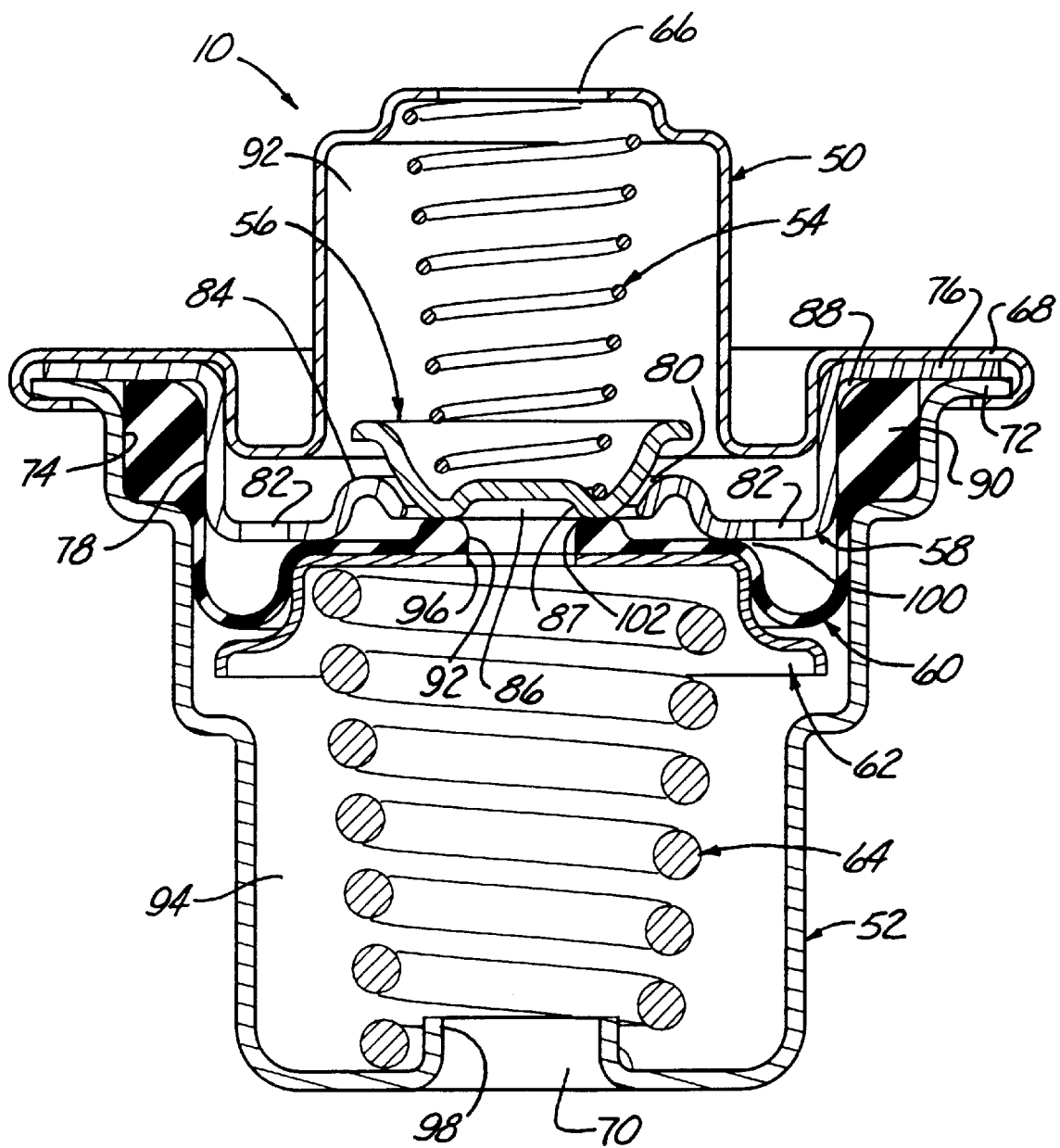
FIG. 2 is a cross-sectional view of the fuel pressure regulator of the present invention taken along lines 2—2 of FIG. 1.

The internal components of the fuel pressure regulator (10) are shown in FIGS. 2 and 3. FIG. 2 is a cross sectional view taken along lines 2—2 of FIG. 1. FIG. 3 is an exploded perspective view of the fuel pressure regulator (10). In the preferred embodiment, the fuel pressure regulator (10) includes a top or first cover (50), a bottom or second cover (52), a seat spring (54), a valve member (56), an end plate (58), a diaphragm (60), a diaphragm backing plate (62), and a control spring (64).

The first cover (50) includes an inlet port (66) and an annular flange (68). The second cover (52) includes an outlet port (70), an annular flange (72), and an annular interior periphery (74). Disposed below and receivingly retained by the first cover (50) is one end of the seat spring (54) (FIG. 2). The other end of the seat spring (54) is receivingly retained by the cup-shaped valve member (56).

The end plate (58) includes an annular flange (76) and an annular exterior periphery (78). The end plate (58) further includes a central aperture (80) and preferably four radially spaced apertures (82). Around the central aperture (80) is a raised annular lip (84). The cup-shaped valve member (56) is disposed axially over the central aperture (80) of the end plate (58) (FIG. 2). The seat spring (54) receivingly restrained by the cup-shaped valve member (56) acts to bias the valve member (56) within the annular lip (84) of the end plate (58). It is preferred that the underside of the valve member (56) includes an indent (86), thereby creating an annular sealing surface (87). The purpose of the indent (86) and annular sealing surface (87) of the valve member (56) will be discussed later.

The annular flange (76) of the end plate (58) is of an outside diameter less than the outside diameter of the annular flange (72) of the second cover (52), but is of sufficient outside diameter such that the end plate (58) is supportable by the annular flange (72) of the second cover (52) (see FIG. 2). The annular exterior periphery (78) of the end plate (58) is of an outside diameter less than the annular interior periphery (74) of the second cover (52) such that an annular area (88) is defined therebetween (FIG. 2).

The diaphragm (60), preferably of an elastomeric material, includes an annular flange (90) and a central aperture (92). The inside and outside diameters of the annular flange (90) of the diaphragm (60) are of such dimension that the annular flange (90) fits snugly within the annular area (88) between the annular interior periphery (74) of the second cover (52) and the annular exterior periphery (78) of the end plate (58). When the annular flange (68) of the first cover (50) is sealingly crimped (FIG. 2) to the annular flange (72) of the second cover (52) with the annular flange (76) of the end plate (58) disposed therebetween, the diaphragm (60) is securely held in place due to the radial and axial compression on the annular flange (90) of the diaphragm (60) disposed in said annular area (88). By axially and radially securing the diaphragm (60) in such a way, no part of the diaphragm (60) is crimped between the first and second housing covers (50, 52) as is typical in most conventional fuel pressure regulators. By eliminating the diaphragm (60) from the crimp, the life of the diaphragm (60) is greatly extended because there is less strain on the diaphragm (60). Thus, the crimping process is no longer a process variable that can effect the life of the diaphragm (60).

With the diaphragm (60) securely retained in place as just described, the diaphragm (60) divides the pressure regulator housing into two chambers; a high pressure upstream chamber (92) (FIG. 2) and a low pressure downstream chamber (94).

The cup-shaped diaphragm backing plate (62) is preferably adhesively bonded to the underside of the diaphragm (60) (FIG. 2) and includes a central aperture (96) coaxial with the central aperture (92) of the diaphragm (60). The cup-shaped diaphragm backing plate (62) receivingly restrains one end of the control spring (64). The other end of the control spring (64) is receivingly restrained by an annular lip (98) extending from the second cover (52) and around the outlet port (70).

Figure 6:
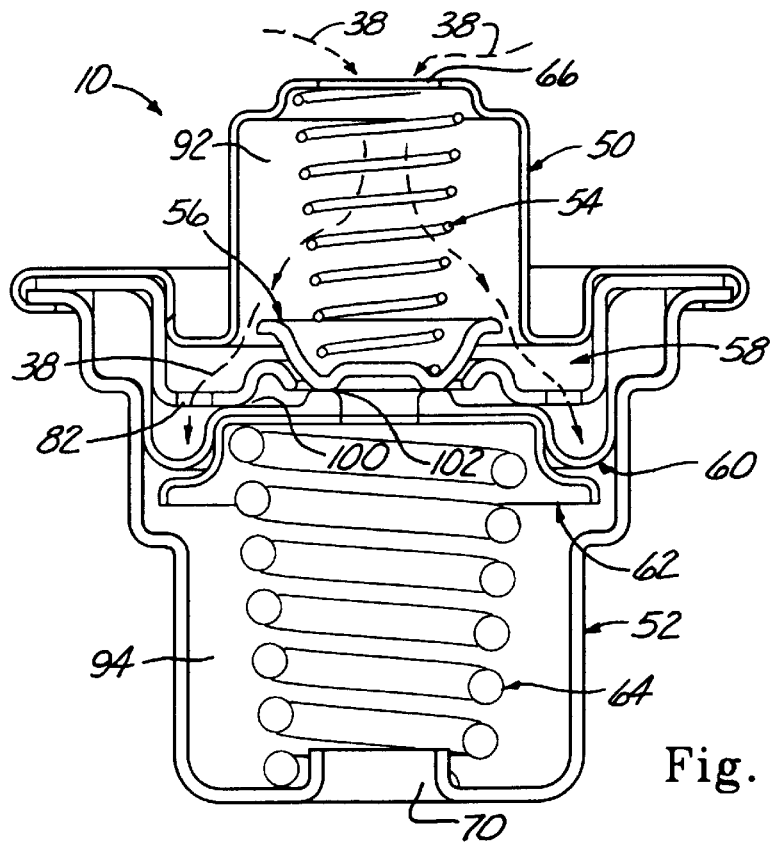
FIG. 6 is a detailed cross-section view of the fuel pressure regulator of the present invention showing the internal component positions and fuel flow when the pressure regulator is in the normally closed position.
Figure 7:
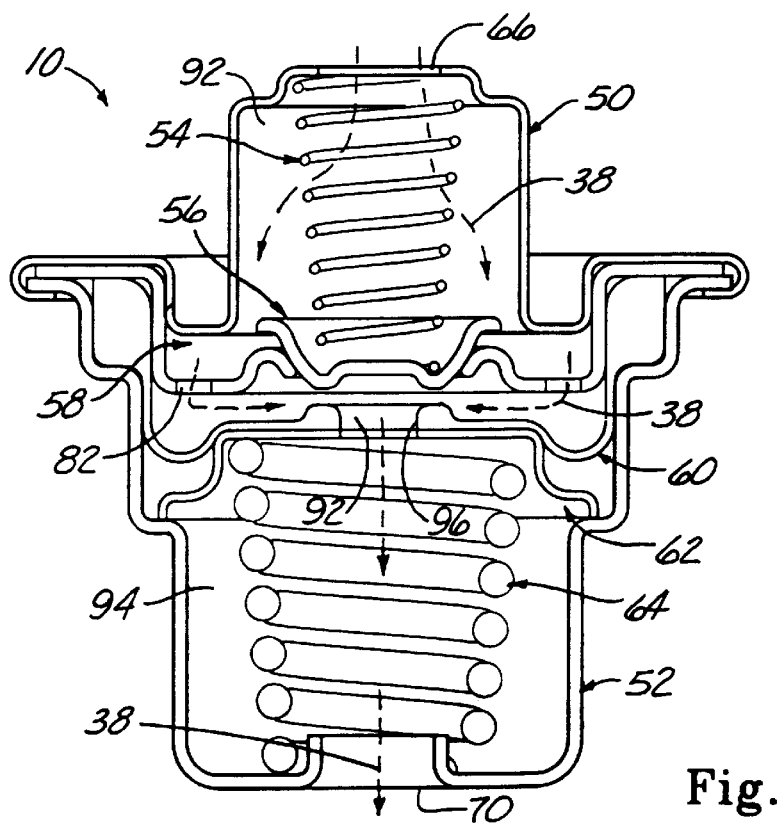
FIG. 7 is a detailed cross-sectional view of the fuel pressure regulator of the present invention showing the internal component positions and fuel flow when the pressure regulator is in the open position.

In FIGS. 6 and 7 a more detailed view of the operation of the pressure regulator (10) is illustrated. FIG. 6 illustrates the positions of the internal components and fuel flow when the fuel pressure regulator (10) is in the normally closed position. FIG. 7 illustrates the positions of the internal components and fuel flow when the pressure regulator (10) is in the open position. In the normally closed position (FIG. 6), the control spring (64) biases the diaphragm (60) against the end plate (58) creating a stop (100) at the plane of contact between the diaphragm (60) and the end plate (58). The control spring (64) also forces the diaphragm (60) against the annular sealing surface (87) of the valve member (54) creating a seal (102) at the plane of contact between the diaphragm (60) and the sealing surface (87) of the valve member (54). It should be appreciated that the seat spring (54) biases the sealing surface (87) of the valve member (56) downwardly against the diaphragm (60) so that the seal (102) is tightly fluidly sealed. It should also be appreciated that because the sealing surface (87) of the valve member (56) includes an indent (86) thereby forming the ring shaped sealing surface (87), a higher unit pressure is created at the seal (102) than could be achieved if the sealing surface of the valve member (56) was flat In the normally closed position (FIG. 6) fuel enters the pressure regulator (10) through the inlet port (66) in the first housing cover (50). As the fuel enters the upstream chamber (92) it is allowed to pass through the apertures (82) in the end plate (58) and also between the valve member (56) and the annular lip (84). The seal (102) prevents the fuel from escaping into the downstream chamber (94). As the pressure in the fuel line (32) and upstream chamber (92) begins to build, the diaphragm (60) will begin to deflect (FIG. 7). When the downward force on the diaphragm (60), due to the fluid pressure on the surface area of the diaphragm (60), begins to exceed the upward bias of the control spring (64), the control spring (64) is compressed or forced downwardly as viewed in FIG. 7. The downward bias of the seat spring (54) keeps the valve member (56) in contact with the diaphragm (60) thus maintaining the seal (102). As the control spring (64) is forced downwardly, the diaphragm (60) will move away from the stop (100). The seal (102) is maintained until the valve member (54) abuts the annular lip (84) of the end plate (58). As the downward pressure on the diaphragm (60) continues to build, the control spring (64) is further compressed downwardly. The abutting surfaces of the valve member (54) and the annular lip (84) (FIG. 7) prevents the valve member (56) from moving downward with the diaphragm (60) and the control spring (64) thus breaking the seal (102) thereby allowing the fuel to flow through the apertures (92, 96) of the diaphragm (60) and diaphragm backing plate (62) and into the downstream chamber (94) where the fuel exits the outlet port (70) and passes into the return port (28) of the fuel filter/regulator housing (22) (FIG. 4 and 5) and into the return line (40) (FIG. 5) where the fuel is discharged back into the fuel tank (12) (FIG. 5). The return flow is indicated by dashed arrow lines (38) in FIGS. 4, 5 and 7.

It will be appreciated that the sealing force on the annular seal is determined by the spring constant of the seat spring (54). Additionally, it should be understood that the control spring (64) controls the operating pressure of the fuel pressure regulator (10). The higher the spring constant, the greater the bias of the diaphragm (60) against the end plate (58) and thus the greater the amount of pressure required to compress the control spring (64) axially downwardly. It should also be understood that when manufacturing the pressure regulator (10) of the present invention, the control spring (64) and seat spring (54) are loaded as the first housing cover (50) and second housing cover (52) are pressed toward one another and their respective flanges (68, 72) are crimped together.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. A fuel pressure regulator, comprising:
   an end plate having an annular flange, an annular exterior periphery and a central aperture;
   a housing comprising a first cover and a second cover, said first cover having an annular flange, said second cover having an annular flange and an annular interior periphery, said annular flanged first cover being mateably secured to said annular flanged second cover with said annular flanged end plate being receivingly secured therebetween, said annular interior periphery of the annular flange of the second cover being disposed radially outwardly from said annular exterior periphery of said end plate;
   an annular area defined by said annular interior periphery of said second cover and said annular exterior periphery of said end plate; and
   a diaphragm having an annular flange and a central aperture coaxial with said central aperture of said end plate, said annular flange of said diaphragm being axially and radially restrained within said annular area, said diaphragm dividing said housing into an upstream chamber and a downstream chamber.

2. The fuel pressure regulator of claim 1 further comprising:
   a control spring acting to bias said diaphragm against said end plate;
   a valve member;
   a seat spring acting to bias said valve member against said diaphragm whereby said central aperture of said diaphragm is fluidly sealed by said valve member.

3. The fuel pressure regulator of claim 2 wherein said valve member includes an annular sealing surface.

4. The fuel pressure regulator of claim 3 wherein said diaphragm is an elastomer material.

5. The fuel pressure regulator of claim 1 wherein said interior periphery of the annular flange of the second cover being substantially parallel to said annular exterior periphery of the end plate.

* * * * *